United States Patent
Kaveri Poompatnam Chandrasekaran et al.

(10) Patent No.: US 12,273,390 B2
(45) Date of Patent: Apr. 8, 2025

(54) DYNAMIC PERMISSIONS MANAGEMENT FOR CLOUD WORKLOADS

(71) Applicant: GM Cruise Holdings LLC, San Francisco, CA (US)

(72) Inventors: Nitish Krishna Kaveri Poompatnam Chandrasekaran, Pleasanton, CA (US); Roman Porter, Bellevue, WA (US); Jeremy Erickson, Renton, WA (US); Tim Hofmann, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 156 days.

(21) Appl. No.: 18/176,330

(22) Filed: Feb. 28, 2023

(65) Prior Publication Data

US 2024/0291866 A1     Aug. 29, 2024

(51) Int. Cl.
    *H04L 9/40*      (2022.01)
    *H04L 67/10*     (2022.01)

(52) U.S. Cl.
    CPC .............. *H04L 63/20* (2013.01); *H04L 67/10* (2013.01)

(58) Field of Classification Search
    CPC ................................ H04L 63/20; H04L 67/10
    See application file for complete search history.

(56) References Cited

U.S. PATENT DOCUMENTS

| 7,975,286 B1* | 7/2011 | Fickey | H04L 63/20 726/4 |
| 2019/0205115 A1* | 7/2019 | Gomes | H04W 4/50 |
| 2022/0116445 A1* | 4/2022 | Filippou | H04L 41/0853 |
| 2022/0121470 A1* | 4/2022 | Saxena | H04L 63/20 |
| 2022/0272127 A1* | 8/2022 | Yawalkar | H04L 63/1433 |
| 2023/0164567 A1* | 5/2023 | Fellows | H04L 63/1416 455/410 |
| 2024/0171613 A1* | 5/2024 | Pereira | G06F 21/57 |
| 2024/0212496 A1* | 6/2024 | Xu | G08G 1/164 |

OTHER PUBLICATIONS

*Security*, Retrieved Jan. 18, 2023, 23 pages, Istio / Security, https://istio.io/latest/docs/concepts/security/.
*AuthN and AuthZ at Cruise: Crawl, Walk, Run*, Retrieved Feb. 28, 2023, 2 pages, https://kccncna2021.sched.com/event/IV6M/authn-and-authz-at-cruise-crawl-walk-run-james-barclay-roman-porter/cruise.
*Sidecar Injection Workhook*, Retrieved Jan. 16, 2023, 6 pages, https://istio.io/v1.2/docs/ops/setup/injection/.
*AuthN and AuthZ at Cruise: Crawl, Walk, Run*, Retrieved Feb. 17, 2023, 35 pages, https://static.sched.com/hosted_files/kccncna2021/c5/AuthN%20and%20AuthZ%20at%20Cruise_%20Crawl%2C%20Walk%2C%20Run.pdf.

* cited by examiner

*Primary Examiner* — El Hadji M Sall

(57) ABSTRACT

Applications supporting operations of an autonomous vehicle fleet can be implemented on and supported by cluster infrastructure. These applications have endpoints where data traffic runs in and out of these applications. Securing access to these endpoints can prevent unauthenticated and unauthorized access to these endpoints and the protected resources accessible through these endpoints. Securing access to these endpoints, managing entitlements and security policies, and maintaining security systems that can enforce the security policies are not trivial tasks. One solution addresses some of these challenges by offering a simple frontend for users to define the entitlements and security policies, leveraging an open source security solution, and ensuring backwards compatibility to other security solutions in the cluster infrastructure.

9 Claims, 8 Drawing Sheets

DYNAMIC PERMISSIONS MANAGEMENT FOR CLOUD WORKLOADS

BACKGROUND

Technical Field

The present disclosure generally relates to cluster infrastructure management and, more specifically, to dynamic permissions management for cloud workloads.

Introduction

Cluster infrastructure can include hardware and software resources deployed to support systems with high availability, scalability, and performance. Systems can be deployed on the cluster infrastructure, and the cluster infrastructure enables the systems to service requests being made to the systems.

Autonomous vehicles (AVs), also known as self-driving cars, and driverless vehicles, may be vehicles that use multiple sensors to sense the environment and move without human input. Technology in AVs may enable vehicles to drive on roadways and to accurately and quickly perceive the vehicle's environment, including obstacles, signs, and traffic lights. AV technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

Applications that support operations of an autonomous vehicle fleet can be implemented on and supported by cluster infrastructure. Examples of such applications (and platforms) are described with FIG. 1. Such applications supporting operations of an autonomous vehicle fleet can be implemented on and supported by cluster infrastructure. These applications can have endpoints where data traffic runs in and out of these applications. Securing access to these endpoints can prevent unauthenticated and unauthorized access to these endpoints and the protected resources within the applications that are accessible through these endpoints.

Figure 1:
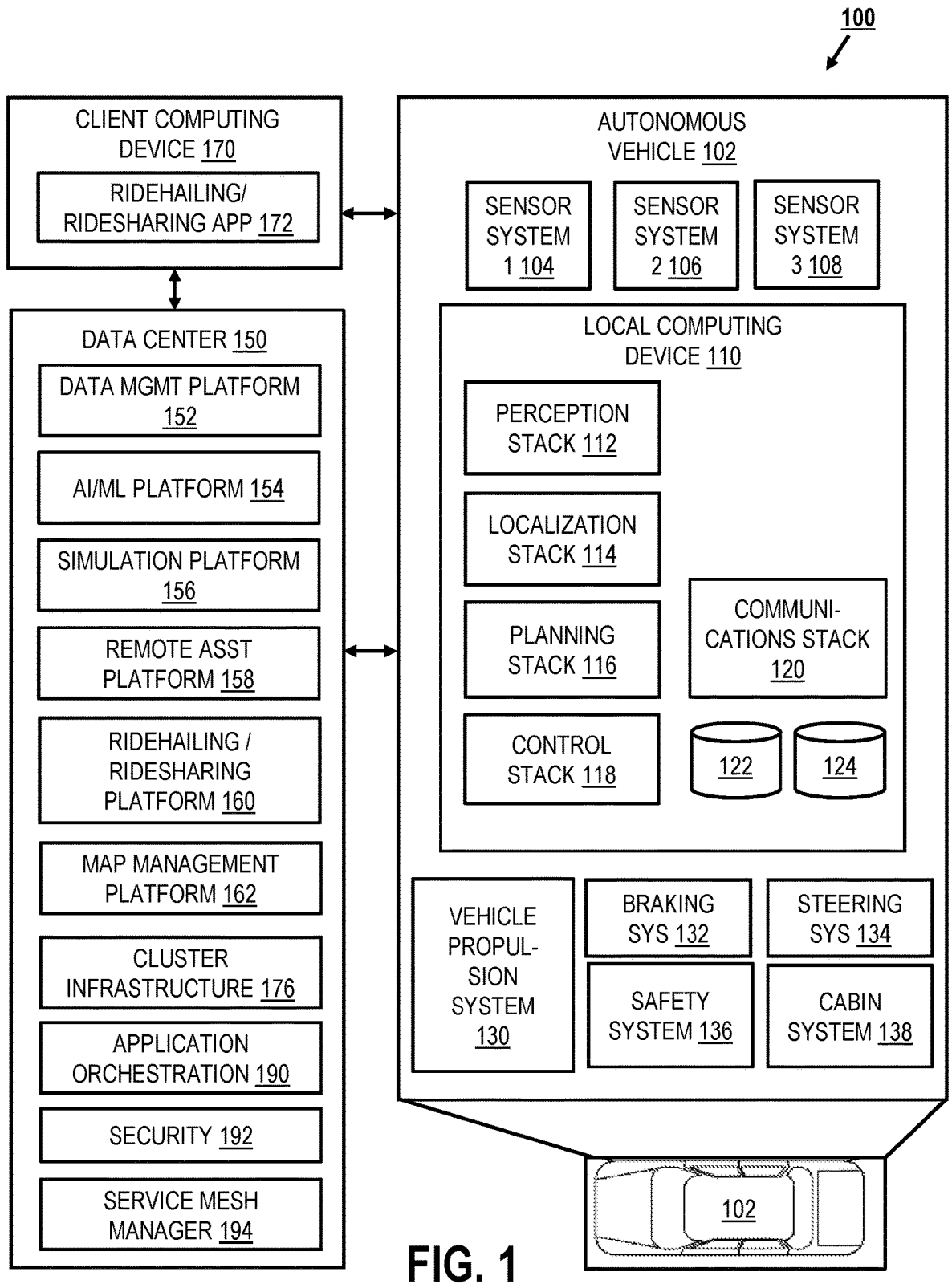
FIG. 1 illustrates an exemplary system environment that may be used to facilitate operations of one or more AVs, according to some aspects of the disclosed technology.

Securing access to these endpoints can be a challenge. In cluster infrastructure, especially ones which are supporting a diverse set of applications as illustrated in FIG. 1, achieving security can be difficult due to complexity of the system. It can be easy for vulnerabilities to creep up in security solutions, and rigorous testing is often done to battle test security solutions. In some cases, custom software is written and maintained, which can be difficult for new security team members to learn since documentation may be limited to internal notes. Also, custom software may not be tested as rigorously as open source, well-established security solutions. In some cases, security enforcement code or implementation is buried deep within an application, which may be difficult to control and manage since there may not be consistency across applications in a cluster. If the entitlements and policies are hardcoded within the application, it may be difficult to have visibility across a cluster to enable automated scanning of policies or to determine easily to what a user has or does not have access. It may be difficult to assess a baseline policy if the entitlements and policies are opaque. Relying on application developers to implement security solutions may mean that in some cases, applications do not have security enabled by default, policies may be misconfigured, or policies may not have been validated before usage, making the application insecure.

Managing entitlements and security policies can be a challenge as well. Application developers responsible for deploying an application may need to learn many tools and systems to configure and encode entitlements and policies within the application, configure security software running within the applications, and ensure all components are working properly. Typically, application developers are not security experts, which means they may not be ideal developers to be implementing security solutions. In addition, application developers may be responsible for updating the application if entitlements or policies change or if new tools are introduced to generate or validate policies, which can be a cumbersome task for the application developer. When updating the security code in the application, the application developers may be responsible for understanding what has changed, and for what the developers may need to test. For many reasons, application developers are not suited to maintain the security code in the application.

Maintaining security systems that can enforce the security policies can cause significant disruption to the applications that implement the software to enforce security policies. When an update to the entitlements and the security policy is made, a new deployment of the application may be needed, which can disrupt the services that the application is providing. Also, when a change to the security software within the application is made, a new deployment of the application (including definition and rerunning of a new test suite for the application) may be needed.

One solution can address some of these challenges by offering a frontend for users to define the entitlements and security policies, leveraging an open source security solution, and ensuring backwards compatibility to other security solutions in the cluster infrastructure. The solution can provide centralized management and distributed enforcement of entitlements and security policies. By using an established, stable security toolset and framework, security in the cluster can be more robust, and can be made consistent across all the applications in the cluster. In addition, the solution can separate enforcement of entitlements and security policies from the application, and can place the enforcement in a sidecar application running alongside the application. As a result, changes to entitlements and security policies can be made and rolled out to various applications easily and swiftly, and does not require changes to the code of the application itself. Also, there can be better visibility into the software that enforces entitlements and security policies. In addition, the security software that performs security enforcement can be enabled easily using metadata, thereby making it easier to ensure security is enabled by default for all applications deployed on the cluster. The system also can translate security policies that application developers have already written into a format that can be compatible with the sidecar application, which means that application developers do not need to rewrite the security policies. Security engineers, not the application developer, can have ownership of the sidecar application, which means that security experts can write the security software.

Systems for an AV Fleet Supported by Cluster Infrastructure

To better understand the varied systems that can be implemented on cluster infrastructure, FIG. 1 illustrates an exemplary system environment that may be used to facilitate AV operations, according to some aspects of the disclosed technology.

One of ordinary skill in the art will understand that, for the AV management system 100 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 may communicate with one another over one or more networks.

AV 102 may navigate about roadways without a human driver based on sensor signals generated by multiple sensor systems 104, 106, and 108. The sensor systems 104-108 may include different types of sensors and may be arranged about the AV 102. For instance, the sensor systems 104-108 may comprise Inertial Measurement Units (IMUs), cameras (e.g., still image cameras, video cameras, etc.), light sensors (e.g., light detection and ranging (LIDAR) systems, ambient light sensors, infrared sensors, etc.), radio detection and ranging (RADAR) systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 may be a camera system, the sensor system 106 may be a LIDAR system, and the sensor system 108 may be a RADAR system. Other embodiments may include any other number and type of sensors.

AV 102 may also include several mechanical systems that may be used to maneuver or operate AV 102. For instance, the mechanical systems may include vehicle propulsion system 130, braking system 132, steering system 134, safety system 136, and cabin system 138, among other systems. Vehicle propulsion system 130 may include an electric motor, an internal combustion engine, or both. The braking system 132 may include an engine brake, a wheel braking system (e.g., a disc braking system that utilizes brake pads), hydraulics, actuators, and/or any other suitable componentry configured to assist in decelerating AV 102. The steering system 134 may include suitable componentry configured to control the direction of movement of the AV 102 during navigation. Safety system 136 may include lights and signal indicators, a parking brake, airbags, and so forth. The cabin system 138 may include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 may include one or more client interfaces (e.g., GUIs, Voice User Interfaces (VUIs), etc.) for controlling certain aspects of the mechanical systems 130-138.

AV 102 may additionally include a local computing device 110 that is in communication with the sensor systems 104-108, the mechanical systems 130-138, the data center 150, and the client computing device 170, among other systems. The local computing device 110 may include one or more processors and memory, including instructions that may be executed by the one or more processors. The instructions may make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108;

and so forth. In this example, the local computing device 110 includes a perception stack 112, a mapping and localization stack 114, a planning stack 116, a control stack 118, a communications stack 120, an HD geospatial database 122, and an AV operational database 124, among other stacks and systems. Collectively, a perception stack 112, a mapping and localization stack 114, a planning stack 116, a control stack 118 of the local computing device 110 may provide functionalities of an AV stack.

Perception stack 112 may enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 may detect and classify objects and determine their current and predicted locations, speeds, directions, and the like. In addition, the perception stack 112 may determine the free space around the AV 102 (e.g., to maintain a safe distance from other objects, change lanes, park the AV, etc.). The perception stack 112 may also identify environmental uncertainties, such as where to look for moving objects, flag areas that may be obscured or blocked from view, and so forth.

Mapping and localization stack 114 may determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 may compare sensor data captured in real-time by the sensor systems 104-108 to data in the HD geospatial database 122 to determine its precise (e.g., accurate to the order of a few centimeters or less) position and orientation. The AV 102 may focus its search based on sensor data from one or more first sensor systems (e.g., GPS) by matching sensor data from one or more second sensor systems (e.g., LIDAR). If the mapping and localization information from one system is unavailable, the AV 102 may use mapping and localization information from a redundant system and/or from remote data sources.

The planning stack 116 may determine how to maneuver or operate the AV 102 safely and efficiently in its environment. For example, the planning stack 116 may receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 may determine multiple sets of one or more mechanical operations that the AV 102 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 may select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 may manage the operation of the vehicle propulsion system 130, the braking system 132, the steering system 134, the safety system 136, and the cabin system 138. The control stack 118 may receive sensor signals from the sensor systems 104-108 as well as communicate with other stacks or components of the local computing device 110 or a remote system (e.g., the data center 150) to effectuate the operation of the AV 102. For example, the control stack 118 may implement the final path or actions from the multiple paths or actions provided by the planning stack 116. The implementation may involve turning the routes and decisions (e.g., a trajectory) from the planning stack 116 into commands for the actuators that control the AV's steering, throttle, brake, and drive unit.

The communication stack 120 may transmit and receive signals between the various stacks and other components of the AV 102 and between the AV 102, the data center 150, the client computing device 170, and other remote systems. The communication stack 120 may enable the local computing device 110 to exchange information remotely over a network. The communication stack 120 may also facilitate local exchange of information, such as through a wired connection or a local wireless connection.

The HD geospatial database 122 may store HD maps and related data of the streets upon which the AV 102 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 124 may store raw AV data generated by the sensor systems 104-108 and other components of the AV 102 and/or data received by the AV 102 from remote systems (e.g., the data center 150, the client computing device 170, etc.). In some embodiments, the raw AV data may include HD LIDAR point cloud data, image or video data, RADAR data, GPS data, and other sensor data that the data center 150 may use for creating or updating AV geospatial data.

The data center 150 may include cluster infrastructure 176, and application orchestration 190 (e.g., software that orchestrates deployments and maintenance of systems and services onto the cluster infrastructure 176). In some cases, the data center 150 may include a plurality of data center facilities (e.g., buildings) in different physical locations.

Data center 150 may physically house cluster infrastructure 176. Cluster infrastructure 176 may include hardware resources and software resources. Hardware resources can include computing/processing resources, data storage resources, network resources, etc. Examples of computing/processing resources may include machine-learning processors (e.g., machine-learning accelerators or neural processing unit), central processing units (CPUs), graphics processing units (GPUs), quantum computers, etc. Examples of data storage resources may include disk storage devices, memory storage devices, database servers, etc. Network resources may include network appliances (e.g., switches, routers, etc.), network connections, interconnects, etc. Software resources may include firmware for the hardware resources, operating systems for the hardware resources, virtual machines running on the hardware resources, software that manage the hardware resources, etc. Cluster infrastructure 176 may include resources managed by one or more providers.

Application orchestration 190 may include software that work with cluster infrastructure 176 to deploy and maintain systems and services (sometimes referred to as applications) running on the cluster infrastructure 176. Application orchestration 190 may allow users of cluster infrastructure 176 to configure, deploy, coordinate, and manage applications on cluster infrastructure 176. Some application orchestration 190 may provide resource usage optimization, achieve certain quality of service parameters, and load balancing of the applications on cluster infrastructure 176. While not required, applications deployed on cluster infrastructure 176 can be containers (or containerized applications). A container means that the code and dependencies are packaged as a unit or image (e.g., having code, runtime, system tools, system libraries and settings) in such a way that the application can be created and run quickly on cluster infrastructure 176 regardless of the underlying cluster infrastructure environment.

The data center 150 may send and receive various signals to and from the AV 102 and the client computing device 170. These signals may include sensor data captured by the sensor systems 104-108, roadside assistance requests, software updates, ridesharing pick-up and drop-off instructions, and so forth.

In this example, the data center 150 includes one or more of a data management platform 152, an Artificial Intelligence/Machine-Learning (AI/ML) platform 154, a simulation platform 156, a remote assistance platform 158, a ridehailing/ridesharing platform 160, and a map management platform 162, among other systems. Many of these systems can be implemented and supported by cluster infrastructure 176.

The data center 150 having cluster infrastructure 176 may be a private cloud (e.g., an enterprise network, a co-location provider network, etc.), a public cloud (e.g., an infrastructure as a service (IaaS) network, a platform as a service (PaaS) network, a software as a service (SaaS) network, or other communication service provider (CSP) network), a hybrid cloud, a multi-cloud, and so forth. The data center 150 may include cluster infrastructure 176, which can include hardware and software resources remote to the local computing device 110 for managing a fleet of AVs and AV-related services. For example, in addition to managing the AV 102, the data center 150 may also support a ridehailing/ridesharing service, a delivery service, a remote/roadside assistance service, street services (e.g., street mapping, street patrol, street cleaning, street metering, parking reservation, etc.), sensor calibration, and the like.

Data management platform 152 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 may access data stored by the data management platform 152 to provide their respective services.

The AI/ML platform 154 may provide the systems for training and evaluating machine-learning algorithms for operating the AV 102 (e.g., machine-learning models used in the AV stack), the simulation platform 156, the remote assistance platform 158, the ridehailing/ridesharing platform 160, the map management platform 162, and other platforms and systems. Using the AI/ML platform 154, data scientists may prepare data sets from the data management platform 152; select, design, and train machine-learning models; evaluate, refine, and deploy the models; maintain, monitor, and retrain the models; and so on.

The simulation platform 156 may simulate (or mimic) and/or augment real-world conditions (e.g., roads, lanes, buildings, obstacles, other traffic participants (e.g., other vehicles, cyclists, and pedestrians), trees, lighting conditions, weather conditions, etc.) so that the AV stack of an AV may be tested in a virtual environment that is similar to a real physical world. The simulation platform 156 may create a virtual environment that emulates physics of the real-world and sensors of an AV. Testing and evaluating AVs in simulation platform 156 can be more efficient and allow for creation of specific traffic scenarios that may occur rarely in the real-world. Moreover, the AV stack can even be tested in thousands of scenarios in parallel in simulation. More specifically, the AV stack may be executed in a simulator simulating various traffic scenarios at a time. With simulation platform 156, the AV stack implementing the perception, prediction, planning, and control algorithms can be developed, evaluated, validated, and fine-tuned in a simulation environment. The simulation platform 156 can also be used to evaluate only a portion of the AV stack.

The remote assistance platform 158 may generate and transmit instructions to control the operation of the AV 102. For example, in response to active trigger(s) being detected by the local computing device 110 on the AV 102, the remote assistance platform 158 may respond by creating a remote assistance session with a remote assistance operator to assist the AV 102. The remote assistance platform 158 may, with assistance from the remote assistance operator, generate and transmit instructions to the AV 102 to cause the AV 102 to perform a special driving maneuver (e.g., to drive AV 102 in reverse). The remote assistance platform 158 may utilize the remote assistance session to communicate with a customer in the AV 102 via the client computing device 170 to resolve concerns of the customer.

The ridehailing/ridesharing platform 160 (e.g., a web application) may interact with a customer of a ridehailing/ridesharing service via a ridehailing/ridesharing application 172 executing on the client computing device 170. Ridehailing/ridesharing platform 160 may provide delivery services as well. The client computing device 170 may be any type of computing system, including a server, desktop computer, laptop, tablet, smartphone, smart wearable device, gaming system, or other general-purpose computing device for accessing the ridehailing/ridesharing application 172. The client computing device 170 may be a customer's mobile computing device or a computing device integrated with the AV 102 (e.g., the local computing device 110). The ridehailing/ridesharing platform 160 may receive requests to be picked up or dropped off from the ridehailing/ridesharing application 172, and dispatch the AV 102 for the trip. A similar platform can be provided for delivery services.

Map management platform 162 may provide a set of tools for the manipulation and management of geographic and spatial (geospatial) and related attribute data. The data management platform 152 may receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data may be processed, and map management platform 162 may render base representations (e.g., tiles (2D), bounding volumes (3D), etc.) of the AV geospatial data to enable users to view, query, label, edit, and otherwise interact with the data. Map management platform 162 may manage workflows and tasks for operating on the AV geospatial data. Map management platform 162 may control access to the AV geospatial data, including granting or limiting access to the AV geospatial data based on user-based, role-based, group-based, task-based, and other attribute-based access control mechanisms. Map management platform 162 may provide version control for the AV geospatial data, such as to track specific changes that (human or machine) map editors have made to the data and to revert changes when necessary. Map management platform 162 may administer release management of the AV geospatial data, including distributing suitable iterations of the data to different users, computing devices, AVs, and other consumers of HD maps. Map management platform 162 may provide analytics regarding the AV geospatial data and related data, such as to generate insights relating to the throughput and quality of mapping tasks.

Data center 150 may include security 192. Security 192 may implement systems and security protocols to manage user/service/application authentication and authorization to secure and protect resources in the cluster infrastructure 176. For instance, security 192 may include identities (and roles) management (e.g., to maintain a database of users/services/applications that may have certain rights in the cluster infrastructure 176). Security 192 may include authorities that can verify identities and to issue tokens or certificates for authenticated users/services/applications. The authorities may revoke tokens or certificates if appropriate. Security 192 may implement authorization protocols to verify whether authenticated users/services/applications have rights to perform certain actions. Authorization protocols can allow authenticated users/services/applications to perform authorized actions, and disallow those users/services/applications to perform unauthorized actions. Security 192 may implement encryption and decryption of data. Security 192 may include one or more ingress controllers. An ingress controller can process incoming data traffic, and disallow data traffic that does not have a token/certificate and only allow data traffic with a valid token to pass through the ingress controller. In some cases, an ingress controller may attach application-specific tokens to the data traffic based on the destination of the data traffic.

Data center 150 may include service mesh manager 194. Service mesh manager 194 may organize and manage communications (e.g., mesh network traffic) between different applications/services (e.g., platforms, cloud workloads) running in cluster infrastructure 176. Service mesh manager 194 may include a data plane and a control plane. The data plane may include proxies deployed as sidecar applications to applications/services running in cluster infrastructure 176. The proxies may mediate and control network communications between applications/services. Proxies may collect and report telemetry. The control plane may manage and configure proxies to route traffic. Besides offering network traffic management and telemetry, service mesh manager 194 may implement network security (e.g., certificate management, authentication, authorization, transport layer security, etc.), and policy enforcement (e.g., traffic rate limiting, etc.).

Data management platform 152, AI/ML platform 154, simulation platform 156, remote assistance platform 158, ridehailing/ridesharing platform 160, map management platform 162 are some illustrative examples of applications (also referred to as cloud workloads) that can be orchestrated by application orchestration 190 so that they can be deployed and implemented on cluster infrastructure 176. Access to these cloud workloads, via endpoints of the cloud workloads, may be restricted based on entitlements and security policies. Security policies may be enforced by security 192 or some other security solution. Ensuring that access to these cloud workloads are only given to authenticated and authorized users/services may protect these cloud workloads from malicious actors trying to compromise AV operations.

Exemplary Cluster Having Nodes and Pods Deployed on Nodes

Cluster infrastructure 176 may include one or more clusters. A cluster operator may define and provision resources in a cluster using a suitable infrastructure manager through machine-readable definition files. Applications (and services) can be deployed onto a cluster using application orchestration (e.g., application orchestration 190 of FIG. 1). Application orchestration can orchestrate deployment, maintenance, and scaling of applications on the resources in a cluster. Application orchestration can implement a control plane in the cluster that may service requests for application deployment and requests for maintaining applications running on the cluster. In some embodiments, a control plane may include persistent, lightweight, distributed key-value data store to store configuration data of the cluster, an application programming interface, a scheduler to assign unscheduled applications to a specific resource in the cluster, one or more controllers/operators each having a reconciliation loop, and a controller manager that manages the one or more controllers/operators. The control plane may orchestrate applications onto resources in the cluster, which may be organized and managed by the control plane using nodes and optionally node pools.

A cluster may have one or more nodes. A node may be a resource on which an application (e.g., systems, services, workloads, etc.) can be deployed. A node may include a virtual or physical machine. Virtual machines are machines that emulate physical machines and are implemented on physical hardware. A node has a corresponding configuration. The configuration may include properties such as a machine type, a resource type, a specific operating system image, a minimum computing platform, amount of allocable data and/or computing resources for the node (also referred to as a shape of a node), a specific network interface, maximum number of applications that can run on the node, etc. The health/status of the node may be managed by the control plane. A node pool may be a group of nodes within a cluster that all have the same configuration. A cluster may have one or more node pools.

A pod may be a unit that can be handled by the scheduler in the control plane. The control plane can schedule pods onto nodes in the cluster infrastructure. A pod may include an application (e.g., containerized application, a container, or a container application) that performs a function or provides a service. The scheduler may schedule pods to nodes or node pools based on the configurations and health/state of the nodes or node pools. The control plane may schedule and deploy one or more pods on a given node. An application can be deployed as a pod on a node in cluster infrastructure. A pod may have one or more resources provisioned for the pod, and/or one or more endpoints configured for the pod. For simplicity, nodes and node pools on which pods are deployed are not shown in the figures.

In some cases, a pod may be configured to run a single application or container. In some cases, a pod may be configured to run multiple applications, or multiple containers.

For example, a pod may include a main application, and one or more sidecar applications (e.g., a sidecar container, or a sidecar container application). The sidecar application can run alongside the (main) container application. Application orchestration may (e.g., application orchestration 190 of FIG. 1) encapsulate a main application and one or more sidecar applications in a single pod. The main application and one or more sidecar applications may be tightly coupled, and may share the same resources (e.g., storage and network interfaces). Sidecar applications may allow developers to extend the functionality of the main application without having to modify the main application. Sidecar applications can be developed and maintained separately from the main application.

In some cases, a pod may include a main application, (optionally) one or more sidecar applications, and one or more initial applications (e.g., an initial container application, or an initial container). The one or more initial applications may be run before other applications of the pod, e.g., the (main) container application or one or more sidecar applications are started. Initial applications can run to completion before the main application starts. If there are multiple initial applications, one initial application may complete successfully before another initial application starts, meaning that the initial applications for a pod may run sequentially before the main application starts. Initial applications may be used to implement utilities or setup scripts that are not present in the main application.

An Exemplary Authorized Path for Accessing a Protected Resource

Figure 2:
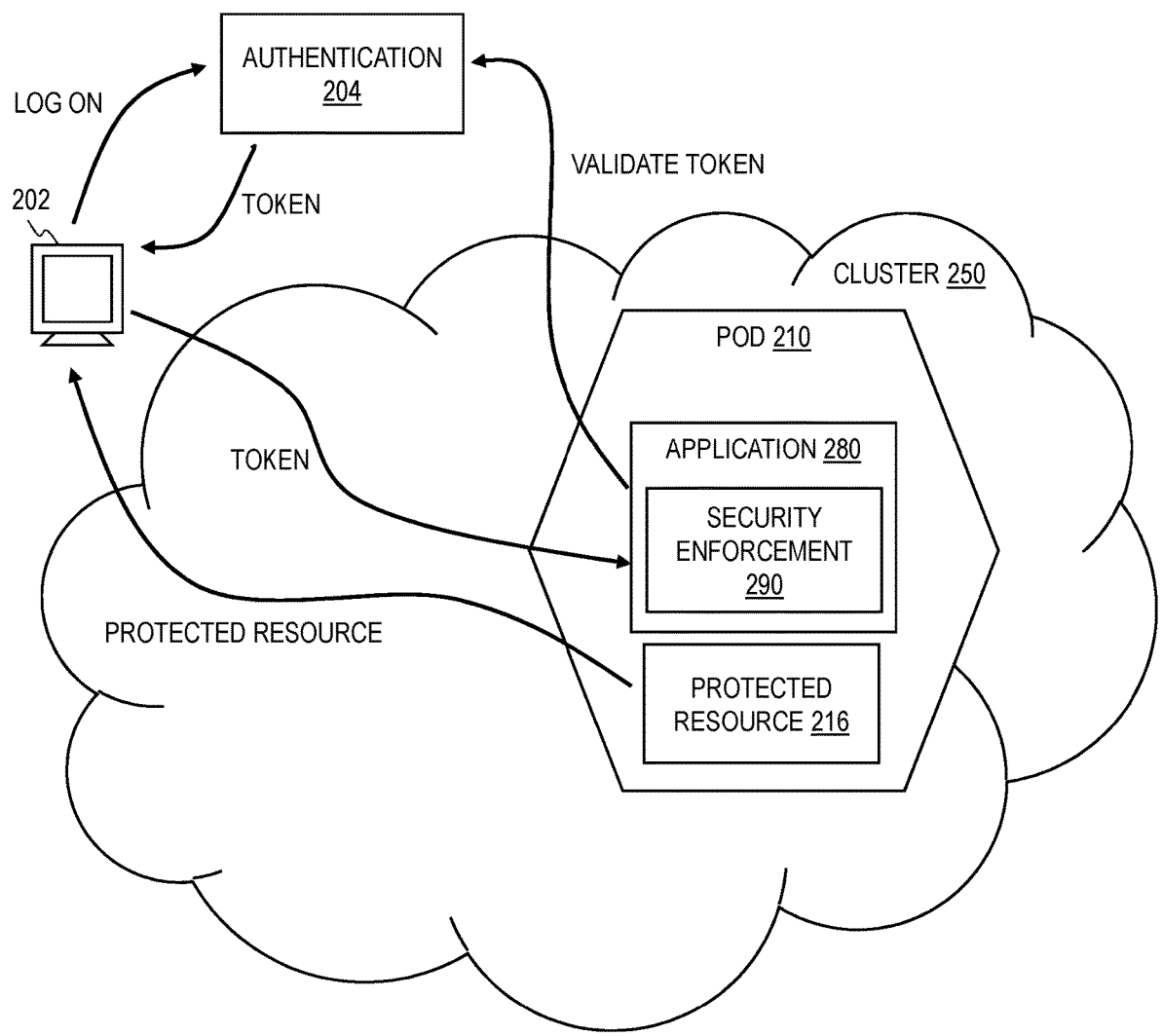
FIG. 2 illustrates an exemplary cluster having a protected resource, and an exemplary mechanism to access the protected resource, according to some aspects of the disclosed technology.

FIG. 2 illustrates an exemplary client 202 of a cluster 250 accessing a protected resource in cluster 250, according to some aspects of the disclosed technology. In some cases, resources are protected by authentication and authorization schemes, such that only authenticated and authorized users/services/applications can access a protected resource. The users/services/applications are illustrated as client 202. Client 202 may log on (e.g., provide a password or a secret) and request a token from authentication 204. If the log on operation is successful, authentication 204 may provide a token (or other suitable credentials) to client 202.

Using the token, client 202 may transmit a request to application 280 of pod 210 to access a protected resource 216 (e.g., to execute a command, or retrieve data). Security enforcement 290 on pod 210 within application 280 may request authentication 204 to validate client 202's token. Security enforcement 290 within application 280 may determine whether the client 202 (e.g., an authenticated client) is authorized to access the protected resource 216 (e.g., using an access control list). In response to determining that the client 202 is authorized to access the protected resource 216, application 280 of pod 210 may provide client 202 access to the protected resource 206. Security enforcement 290 may be coded within application 280, and outside observers may have no visibility into the code that implements security enforcement 290.

Systems like the one illustrated in FIG. 2 can suffer from some shortcomings. Some of the shortcomings are mentioned in the overview. While there is just one pod, i.e., pod 210, shown in the figure, it is envisioned that cluster infrastructure that supports many applications (e.g., applications and platforms illustrated in FIG. 1) would have many more pods. A high number of resources may be protected against authorized access. Also, various routes or paths to these pods may be restricted to authenticated and authorized users/services. The cluster 250 may be highly complex, and its security may be difficult to manage. As shown in FIG. 2, security enforcement 290 may be buried within the application 280. It can be difficult to control and manage since there may not be consistency across applications (because individual developers of applications are relied upon to "do the right thing") in a cluster, and the implementation may be opaque. If a change to security enforcement 290 is to be made, a new deployment of application 280 may be needed, which can be disruptive.

Centralized Management of Entitlements and Policies, Distributed Security Enforcement To address some of the shortcomings, a security solution that allows for centralized management of entitlements and policies, and distributed security enforcement can be implemented. Besides making the security solution more robust and easier to maintain, the system takes backwards compatibility into account, making it easy to have security enabled by default on new applications and minimize changes needed from application developers to enable and implement security with legacy applications.

The security solution can be implemented on cluster infrastructure, (e.g., as cluster infrastructure 176 of FIG. 1). To manage applications deployed on cluster infrastructure, an application orchestration system (e.g., application orchestration 190) can be used and included on cluster infrastructure The application orchestration system may receive a request from an application developer to deploy an application on the cluster infrastructure. For example, the application orchestration system may receive a request to create an application as a pod on cluster infrastructure. The application orchestration system may schedule the application to the pod. The request can include metadata provided by the application developer (e.g., annotations, labels, flags, key-value pairs, etc.). The metadata can include first metadata that indicates a security policy agent is enabled. For example, the first metadata may include a label, "security-agent-injection: true", where the key is "security-agent-injection", and the value is "true". Having the first metadata may allow the application to opt-in to having a security agent injected. Using metadata allows application developers to easily opt-in without having to write code to implement security for their applications. Also, the metadata can be checked at the time of application/pod creation to consistently make sure that security can be provided to any new applications/pods that request to have the security agent enabled/injected, before the application runs. Even if the metadata does not indicate that a security agent should be injected, the controller may inject a basic or default security agent to ensure there is a non-exception, developer-does-nothing path that implements security for applications by default. In some cases, the metadata may explicitly opt-out of having the security agent enabled/injected. The approach of using metadata to enable (or not enable) a security policy agent means that it is possible to have a survey of applications (survey of the metadata of the applications) on the cluster infrastructure and easily identify which applications have the security policy agent enabled, and which applications do not have the security policy agent enabled. Security engineers may use this survey to identify which applications should be prioritized for a security review.

A controller (e.g., an admission controller) can be provided in the application orchestration system, to read the metadata in the request. The controller can inject a security policy agent sidecar application to the pod to run alongside the application in the pod. The controller can detect that the metadata in the request includes first metadata indicating that a security policy agent is enabled, and inject the security policy agent sidecar application to the pod accordingly. The controller may inject (application-specific) configuration for the security policy agent sidecar application, if applicable. Depending on the type of application being deployed, different configurations can be injected for the security policy agent sidecar application, making security enforcement adaptable and flexible. In some cases, the application-specific configuration may include a path for the security policy agent sidecar application to fetch/download an application-specific security policy.

Sidecar applications are not part of the main application, which means that the code for the sidecar application is separate from the main application. Updates to the sidecar application may impact deployments of the sidecar application, but would not impact the main application deployed on the pod. Security teams managing security in the cluster can control the sidecar application and may have visibility into how security is enforced by the sidecar application. Having separate sidecar applications to implement security and having control over the sidecar applications may also mean that security teams can ensure that security is consistently enforced across the cluster.

Entitlements and security policies may be centrally managed through an authorization manager. Security policy bundle storage can be included to host a security policy (bundle or package) for the application. Security policy bundle storage can host other security policies for other applications. All security policy bundles for various applications may be stored in a bucket, where application-specific bundles may be a uniquely named object in the bucket. Tokens, keys, or secrets may be used by the security policy agent sidecar application to access the bucket.

Application developers may edit and submit entitlements and security policies through a frontend of the authorization manager. The frontend may include a graphical user interface for application developers to specify entitlements and define security policies for their applications.

The entitlements and security policies may then be processed by a backend of the authorization manager. The backend can maintain a database of entitlements and security policies. The backend can track when updates to the entitlements and security policies are made so that update bundles are pushed to the cloud storage, and security policies can be distributed to the security policy sidecar applications running with various applications. The backend can package and store security policies in cloud storage (e.g., bucket). The entitlements and security policies received through the frontend can be formatted by the backend into one or more files that can be read by (may be compatible with) the security policy agent sidecar application. If the received entitlements and security policies are not compatible with the security policy agent sidecar application, the authorization manager may parse and translate the entitlements and security policy (e.g., entitlements and security policies of legacy applications) into a format that is compatible with the security policy agent sidecar application. The translated security policy may be packaged and stored in cloud storage. Security policy bundles in cloud storage may be cryptographically signed using a private key of the authorization manager, and the security policy agent sidecar application may verify the integrity and authenticity of the downloaded security policy bundle using a public key of the authorization manager.

The security policy agent sidecar application can fetch or receive the (translated) security policy from the security policy bundle storage. The security policy agent sidecar application can download a security policy (bundle), and unpackage the bundle to access the latest entitlements and security policies. The security policy agent sidecar application can enforce the translated security policy. The security policy agent sidecar application may fetch/pull/receive security policies from the security policy bundle storage regularly. If changes are made to the security policies, updates can be pushed to the security policy agent sidecar applications timely. Phrased differently, the security policy agent sidecar application can be kept in sync with the security policies in cloud storage. In some cases, the security policy agent sidecar application may detect that an update to the security policy is needed or the copy of the security policy is outdated, and the security policy agent sidecar application may fetch the new security policy.

Preferably, the security policy agent sidecar application implements toolsets and framework that is based on an open source security solution (i.e., using code libraries from an open source security solution). Using standard open source tools as opposed to custom code can make the systems easier to learn, implement, and maintain. Battle tested open source tools may also be more robust.

In some cases, the security policy agent sidecar application can enforce security policies that dictate which users/services can access protected resources on the pod. In some cases, the security policy agent sidecar application can enforce route-based security policies that dictate which users/services can communicate with protected endpoints on the pod. To implement route-based security, the service mesh manager can use a service mesh proxy sidecar to route traffic to the security policy agent sidecar application to determine authorization decisions of the traffic.

In some embodiments, the request to deploy an application may include second metadata indicating a service mesh proxy is enabled. The first metadata may include an annotation, "service-mesh-proxy: true", where the key is "service-mesh-proxy", and the value is "true". Having the second metadata may allow the application to opt-in to having a service mesh proxy injected, or using service mesh manager (e.g., service mesh manager 194). The controller can detect the second metadata indicating that a service mesh proxy is enabled, and injects a service mesh proxy sidecar application to the pod. Even if the metadata does not indicate participation with the service mesh manager or having the service mesh proxy injected, the controller may inject the proxy to ensure that routing of traffic to the security policy agent sidecar application can be performed in the pod by default. In some cases, the metadata may explicitly opt-out of having the proxy enabled/injected. The service mesh proxy sidecar application injected on a pod can route authorization requests to the security policy agent sidecar application. The security policy agent sidecar application can make authorization decisions of the authorization requests based on the (translated) security policy.

In some cases, the security policy agent sidecar application is injected into the pod, and the service mesh proxy sidecar application is not injected into the pod. In some cases, the security policy agent sidecar application is not injected into the pod, and the service mesh proxy sidecar application is injected into the pod.

In some cases, the security policy agent sidecar application and the service mesh proxy sidecar application are preferably injected into the pod. The sidecar applications may be injected as initial/utility sidecar applications to a main application, to ensure that the main application would be secured by the sidecar applications when the application runs.

Figure 3:
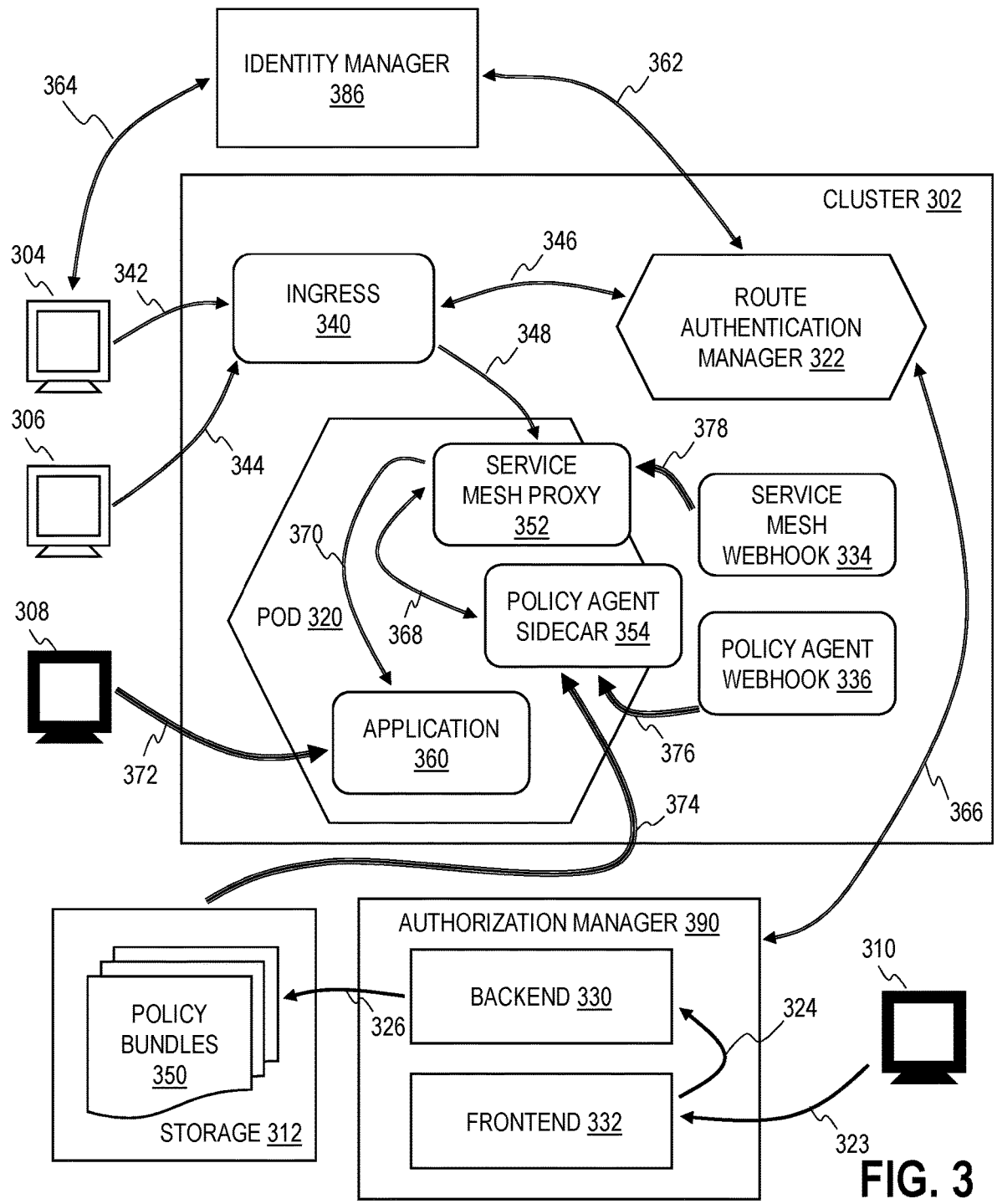
FIG. 3 illustrates an exemplary application deployed on a cluster, an exemplary identity manager, an exemplary authorization manager, an exemplary storage, exemplary users, and exemplary clients, according to some aspects of the disclosed technology.
Figure 4:
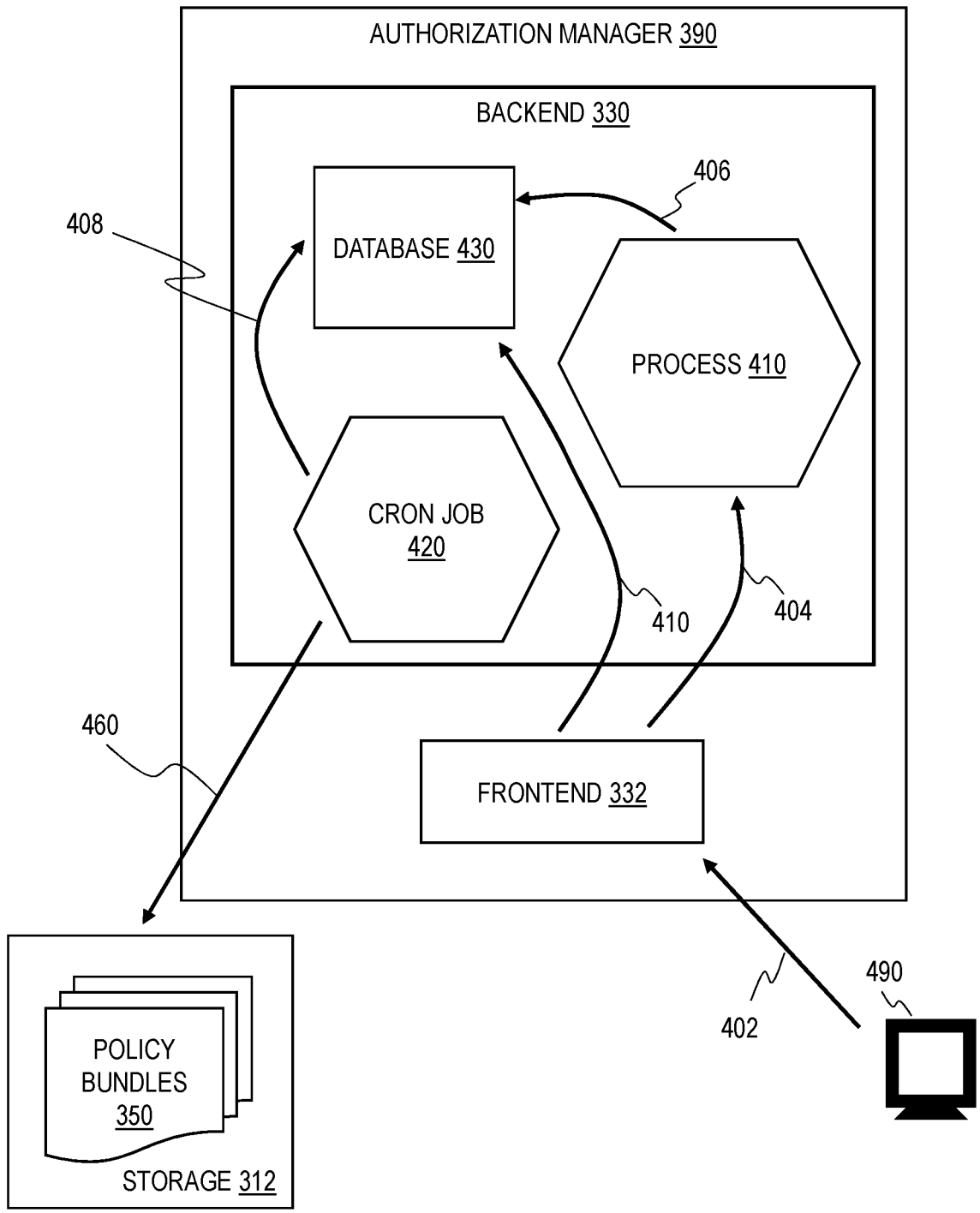
FIG. 4 illustrates an exemplary authorization manager, an exemplary storage, and an exemplary user, according to some aspects of the disclosed technology.

Details of the components and examples for various workflow are illustrated in greater detail in FIGS. 3 and 4. For example, the controller may include one or more webhooks (e.g., mutating webhook watches or admission webhooks).

Exemplary Implementation of a Security Solution

FIG. 3 illustrates an exemplary application 360 deployed on a cluster 302 (application 360 is deployed as a pod 320), an exemplary identity manager 386, an exemplary authorization manager 390, an exemplary storage 312, exemplary users 308 and 310 (e.g., application developers), and exemplary clients 304 and 306 (e.g., users on a device, services, browsers, applications), according to some aspects of the disclosed technology. The figure illustrates some exemplary authentication workflows, some exemplary authorization workflows, some exemplary workflows for creating entitlements and security policies, an exemplary workflow for deploying applications, etc.

In some embodiments, user 310 may create entitlements and security policies using the system shown in FIG. 3. Illustrated as arrow 323, user 310 may access frontend 332 of authorization manager 390 (e.g., navigates to a web portal or graphical user interface of authorization manager 390), and define a set of entitlements. Exemplary entitlements may include authorizations or rights to perform certain actions/commands or access certain resources/endpoints. The user 310 may assign an entitlement to one or more of: users, groups, or services. The user 310 may define a (route-based) authorization policy by creating various routes (e.g.,/admin,/get,/healthcheck, etc.) and entitlements to access those routes. Frontend 332 may pass the received information to backend 330, which is illustrated as arrow 324. In some cases, user 310 may confirm, through the user interface of the frontend 332, that a default set of entitlements and a default (route-based) authorization policy may be used for the application. In some cases, the frontend 332 may collate the received information from user 310, e.g., the set of entitlements and the (route-based) authorization policy, and compile the received information into JavaScript Object Notation (JSON) file. The JSON file can be provided to backend 330 for further processing. Backend 330 of authorization manager 390 may store the received information in a database. Backend 330 may translate/convert the received entitlements and (route-based) authorization policy into a format that the security policy agent sidecar application can understand or interpret. The backend 330 may bundle the translated/converted information, and write the bundle to an application-specific location in storage 312, which is illustrated as arrow 326. Storage 312 may store various application-specific policy bundles 350. A more detailed workflow is further described in FIG. 4.

In some embodiments, user 308 may transmit a request to deploy an application 360. Deployment of the application 360 as pod 320 onto cluster infrastructure is illustrated by arrow 372. The request may include metadata for the pod 320 to be created for the application 360, and an image of the application 360. The metadata may include an annotation indicating that a service mesh proxy sidecar is enabled, and a label indicating that a security policy agent sidecar is enabled. Metadata in the request may trigger webhooks of a controller to perform certain operations. A request by itself may trigger webhooks of a controller to perform certain default operations when a pod is being created. The metadata may allow user 308 to opt-in to having the security solution implemented with application 360.

As illustrated by arrow 378, a service mesh proxy webhook 334 of a controller may detect the annotation in the metadata. In response to detecting the annotation, the service mesh proxy webhook 334 may embed/inject a service mesh proxy sidecar application 352 into the pod. In some cases, the service mesh proxy webhook 334 detects a request to deploy application 360, and by default embed/inject a service mesh proxy sidecar application 352 into the pod.

As illustrated by arrow 376, a security policy agent webhook 336 of the controller may detect the label in the metadata. In response to detecting the label, the security policy agent webhook 336 may embed/inject a security policy agent sidecar application 354 into the pod. In some cases, the security policy agent webhook 336 detects a request to deploy application 360, and by default embed/inject a security policy agent sidecar application 354 into the pod. In some embodiments, the security policy agent webhook 336 may inject security policy agent configuration specific to the application 360 for the security policy agent sidecar application 354. The security policy agent configuration may have a path to retrieve the security policy bundle specific to the application from the security policy bundle storage.

Webhooks such as the service mesh proxy webhook 334 and security policy agent webhook 336, may inject one or more initial/utility applications to setup the operations of the service mesh proxy sidecar application 352 and/or security policy agent sidecar application 354. In some embodiments, the security policy agent webhook 336 may inject an initial/utility application to fetch an access token to access the security policy bundle for the application at the security policy bundle storage. The service mesh proxy webhook 334 may inject an initial/utility application to direct data traffic to the application pod to the service mesh proxy sidecar application. The initial/utility application may configure the service mesh proxy sidecar application 352 as the proxy to receive all traffic targeted to the application 360.

As illustrated by arrow 374, the security policy agent sidecar application 354 may fetch/retrieve, a security policy bundle for the application from a security policy bundle storage 312. The security policy agent sidecar application may utilize a configured path provided in the application-specific configuration for the security policy agent sidecar application 354. Bundles in storage 312 may be organized based on application-specific names. The security policy agent sidecar application 354 may read the application name from an application orchestration system, which may maintain a manifest of various applications. The application name may be read from a label in an entry corresponding to application 360 in the manifest. The security policy agent sidecar application 354 may download and unpackage the bundle. Using the contents of the bundle, the security policy agent sidecar application 354 may process authorization requests for access to one or more endpoints of the application from the service mesh proxy sidecar application based on the security policy bundle for the application.

In some embodiments, clients 304 and 306 may transmit requests to access protected resources and/or endpoints in cluster 302. Examples of clients 304 and 306 may include: users, users using a browser, users using a command line tool (CLI), applications, and services. Clients 304 and 306 may wish to access protected resources and/or endpoints in cluster 302. For example, if client 304 tries to access application 360 using the host address of application 360, domain name service may redirect the request to the client with the destination pointing to ingress 340. Ingress 340 may be an endpoint that processes all traffic entering cluster 302 from outside cluster 302. Ingress 340 may be a service mesh ingress controller. The request from client 304 directed to ingress 340 is illustrated by arrow 342. Client 304 may represent a user attempting to access application 360 through a web browser. The request from client 306 directed to ingress 340 is illustrated by arrow 344. Client 306 may represent a command line tool or application/service attempting to access application 360. Client 304 may transmit a request that does not have a bearer token. Client 306 may transmit a request that has a bearer token. The bearer token may have been attached to the request (or data traffic) by client 306 outside of cluster 302.

In some cases, the request may be forwarded to route authentication manager 322 for further processing, as illustrated by arrow 346. Route authentication manager 322 may be running within cluster 302. Route authentication manager 322 may ensure that only requests from authenticated sources, such as clients with a valid token, are authorized to reach the destination within cluster 302 (e.g., pod 320). Route authentication manager 322 may inspect information in the body of the request to determine whether a token was included. If a token is in the request, and the token is valid, the route authentication manager 322 returns a suitable response to ingress 340, as illustrated by arrow 346. Ingress 340 may then forward the request to pod 320, as illustrated by arrow 348. If a token is not in the request, route authentication manager 322 may trigger identity manager 386 to authenticate client 304. Route authentication manager 322 may include callback information (e.g., a callback unique resource identifier) pointing to cluster 302 so that identity manager 386 may return an identity token back to route authentication manager 322 on cluster 302. Identity manager 386 may request user on client 304 to log onto identity manager 386, as illustrated by arrow 364. Once identity manager 386 can confirm/authenticate the identity of user on client 304 via suitable methods (e.g., passwords, biometrics, two-factor authentication, etc.), an identity token for client 304 may be generated by the identity manager and sent to route authentication manager 322, as illustrated by arrow 362. The identity token for client 304 may be used by route authentication manager 322 to obtain an access token from authorization manager 390, as illustrated by arrow 366. The access token may include an identity of the application 360 that client 304 is attempting to access, and assigned entitlements to the application 360 that client 304 is attempting to access. The route authentication manager 322 may attach the access token to the request and provides the request with the access token attached back to ingress 340, as illustrated by arrow 346. In some cases, the access token is attached to the request (e.g., data traffic) by the route authentication manager 322 deployed on cluster 302, and may be forwarded back to ingress 340. Ingress 340 may forward the request with the access token to pod 320, as illustrated by arrow 348.

Ingress 340 may receive data traffic having a token (e.g., a bearer token, or access token) attached to the data traffic. The token may identify an authenticated user. In some cases, the token may include the application 360 that client 304 is attempting to access, and assigned entitlements to the application 360 that client 304 is attempting to access. Service mesh proxy sidecar application 352 may intercept (all) data traffic to the application 360. Service mesh proxy sidecar application 352 may forward (all) data traffic to security policy agent sidecar application 354 for processing, as illustrated by arrow 368. Security policy agent sidecar application 354 may determine an authorization decision based on the token and a security policy bundle loaded on pod 320. The security policy bundle may include entitlements assigned to users and a security policy. In some embodiments, the security policy agent sidecar application 354 may read the token and validate the token against the entitlements based on the security policy. The security policy agent sidecar application 354 may return an authorization decision, as illustrated by arrow 368. The authorization decision may be an allow decision or a deny decision. Service mesh proxy sidecar application 352 may forward the data traffic to application 360 on pod 320 in response to determining that the authorization decision is an allow decision, as illustrated by arrow 370. Service mesh proxy sidecar application 352 may return an error message (e.g., a 403 message) to the user on client 304 or 306 in response to determining that the authorization decision is a deny decision.

Service mesh proxy sidecar application 352 may be implemented as a sidecar application, or sidecar container application to the application 360. One benefit of the service mesh proxy sidecar application 352 as a sidecar application is that the service mesh proxy sidecar application 352 can enforce that all traffic must arrive at the service mesh proxy sidecar application 352 first. The service mesh proxy sidecar application 352 can then proxy the traffic to the actual application. This configuration can ensure that an attacker cannot communicate with the application directly, and bypass the security measures.

Service mesh proxy sidecar application 352 and/or security policy agent sidecar application 354 may be implemented as initial/utility applications to the application 360.

As an initial/utility application, the service mesh proxy sidecar application 352 and/or security policy agent sidecar application 354 may run first, before the application 360 can run. In other words, the application 360 may not run without the service mesh proxy sidecar application 352 and/or security policy agent sidecar application 354 running first. Enforcing the presence of the service mesh proxy sidecar application 352 and/or security policy agent sidecar application 354 before the application 360 can run can make sure the lifetime of service mesh proxy sidecar application 352 and/or security policy agent sidecar application 354, and the lifetime of the application 360 are coupled. The coupling helps ensure that the application 360 cannot come up and be available (and thus unsecured), if the service mesh proxy sidecar application 352 and/or security policy agent sidecar application 354 did not come up correctly.

Exemplary System for Managing Entitlements and Policies

FIG. 4 illustrates an exemplary authorization manager 309, an exemplary storage 312, and an exemplary user 490, according to some aspects of the disclosed technology. Some workflows relating to authorization manager 390 for managing entitlements and security policies are described with FIG. 3. FIG. 4 illustrates further details of the workflows. Frontend 332 may include a JSON file building wizard. Through frontend 332, as illustrated by arrow 402, user 490 may create entitlements for an application and assign entitlements to users, groups, or services. Through frontend 332, user 490 may create routes and assign entitlements to routes (referred to herein as route-based authorization policies). Frontend 332 may collect the information from user 490 and compile the information into one or more JSON files.

In some embodiments, a post request to send the information (e.g., set of entitlements and/or route-based authorization policy) may be transmitted to a backend 330 of authorization manager 390, as illustrated by arrow 404. The post request may include one or more JSON files created/compiled by frontend 332 based on information received from user 490 via a user interface.

In some embodiments, the post request is sent to a process 410 (e.g., running as a pod), as illustrated by arrow 404. Process 410 may validate and parse the information in the post request, e.g., the entitlements and security policies. Process 410 may format/convert the information to a format that is compatible with the security policy agent sidecar applications. Process 410 may augment/change the information if appropriate (e.g., making the entitlements and policies more restrictive if the entitlements and policies are too relaxed, correcting conflicts or errors in the entitlements and policies, etc.). Process 410 may write or save the processed information to a database 430 (e.g., a distributed database), as illustrated by arrow 406. A cron job 420 may be included in backend 330 to run at a regular interval (e.g., every five minutes, every hour, etc.) to detect new policies or changes to existing policies in database 430, as illustrated by arrow 408. Cron job 420 may regularly check database 430 for one or more of: a new security policy, and a change to an existing security policy. Cron job 420 may augment and format the entitlements and the route-based authorization policy information from database 430 into a JSON file and a policy code file (e.g., a rego file). The JSON file may include entitlements. Cron job 420 may package the JSON file and policy code file into an archive file (e.g., a tarball, a zipped file, etc.). The archive file may be the security policy bundle for an application. The archive file may be written onto storage 312 as illustrated by arrow 460. If an existing archive file already exists on storage 312, storage 312 may backup the existing archive file, and write the new one in place of the existing archive file. When an update to a bundle for an application is made to storage 312, a security policy sidecar application for the application may be triggered to sync with storage 312 to update the policy being applied by the security policy sidecar application.

In some embodiments, the JSON file encoding entitlements maps entitlements to groups of users, and not directly to the users themselves. This mapping may mean that a user's token may include entitlements assigned to the user, so that the user's entitlements can be validated by the security policy sidecar application. The token can grow very large, making it difficult for the system to manage. In some embodiments, cron job 420 may flatten entitlement assignments to groups into entitlement assignments to users in the JSON file encoding entitlements in the security policy bundle, to address this issue. When entitlements are directly assigned to users of a group and are included in the JSON file of the security policy bundle, the security agent sidecar application may look up entitlements for the user/service in the security policy bundle instead of in the token. Cron job 420 may detect whether a group in database 430 has received entitlements, and can flatten the group into its membership (i.e., users of the group). The flatten entitlements directly assigned to users may be compiled into the JSON file as part of the security policy bundle.

Figure 5:
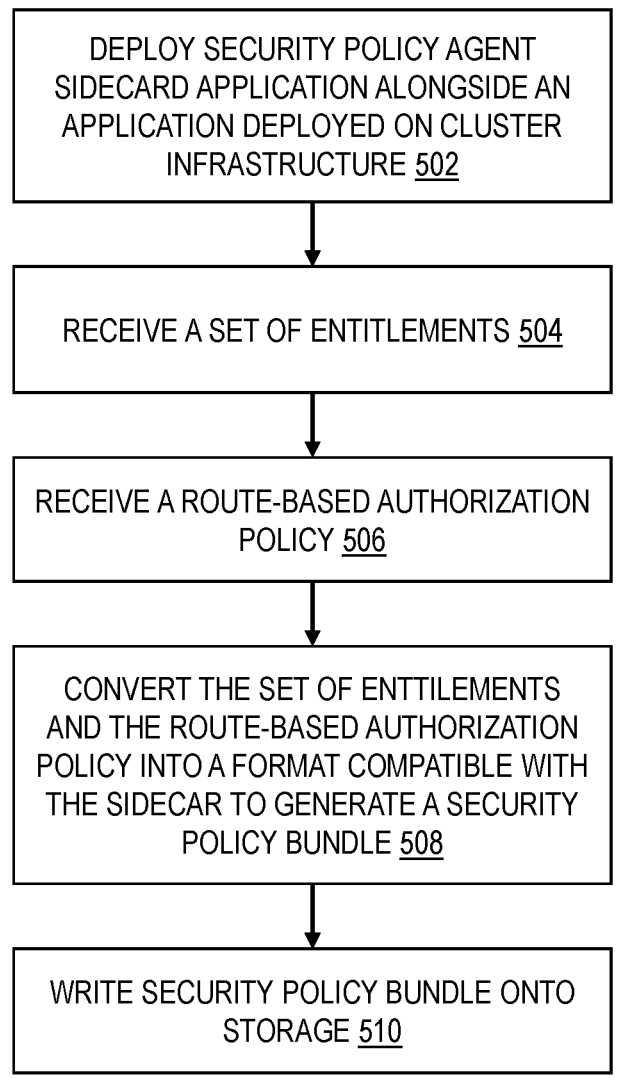
FIG. 5 is a flow diagram illustrating an exemplary computer-implemented method for security policy management, according to some aspects of the disclosed technology.

Exemplary Computer-Implemented Methods Carrying Out Various Aspects of Permission Management and Enforcement for Cloud Workloads FIG. 5 is a flow diagram illustrating an exemplary computer-implemented method for security policy management, according to some aspects of the disclosed technology. Various components illustrated in FIGS. 3-4 may carry out the computer-implemented method. In 502, a security policy agent sidecar application may be deployed alongside an application deployed on cluster infrastructure. In 504, a set of entitlements assigned to one or more of: users, groups, or services may be received from an application developer. In 506, a route-based authorization policy for the application comprising one or more routes and entitlements to access the one or more routes may be received from the application developer. In 508, a security policy bundle for the application may be generated by converting the set of entitlements and the route-based authorization policy into a format compatible with the security policy agent sidecar application. In 510, the security policy bundle for the application may be written onto security policy bundle storage.

Figure 6:
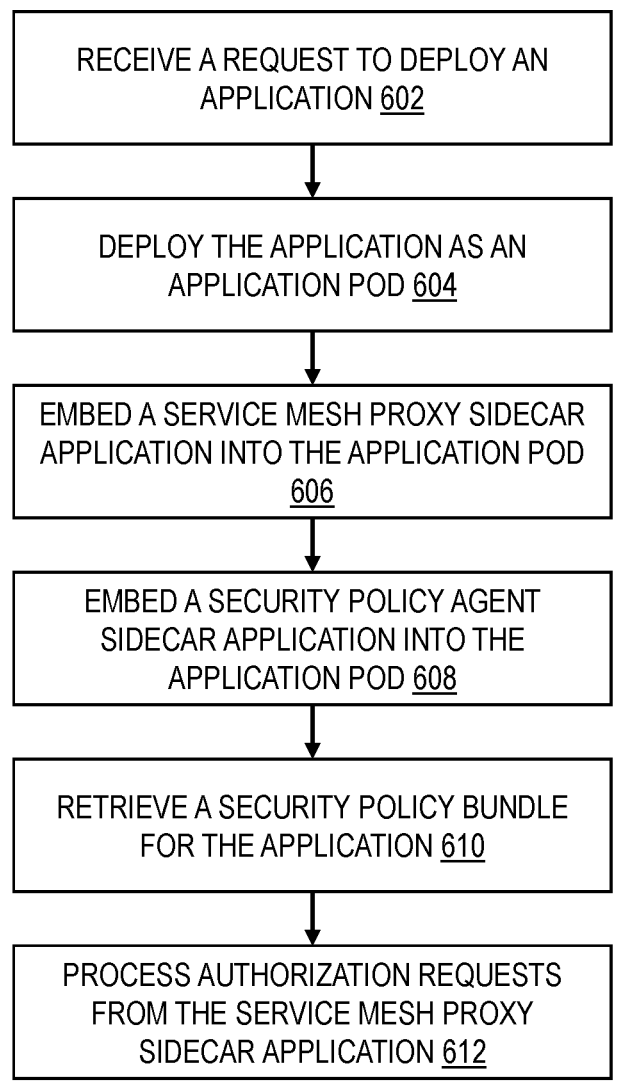
FIG. 6 is a flow diagram illustrating an exemplary computer-implemented method for provisioning security enforcement, according to some aspects of the disclosed technology.

FIG. 6 is a flow diagram illustrating an exemplary computer-implemented method for provisioning security enforcement, according to some aspects of the disclosed technology. Various components illustrated in FIGS. 3-4 may carry out the computer-implemented method. In 602, a request to deploy an application may be received. The request can include metadata and an image of the application. In some cases, the metadata may include an annotation indicating that a service mesh proxy sidecar application is enabled, and a label indicating that a security policy agent sidecar is enabled. In 604, the application may be deployed as an application pod on cluster infrastructure. In 606, a service mesh proxy sidecar application may be embedded/ injected into the application pod. In 608, the security policy agent sidecar application may be embedded/injected into the application pod.

In 610, the security policy agent sidecar application may retrieve a security policy bundle for the application from a security policy bundle storage. In 612, the security policy agent sidecar application may process authorization requests for access to one or more endpoints of the application from the service mesh proxy sidecar application based on the security policy bundle for the application.

Figure 7:
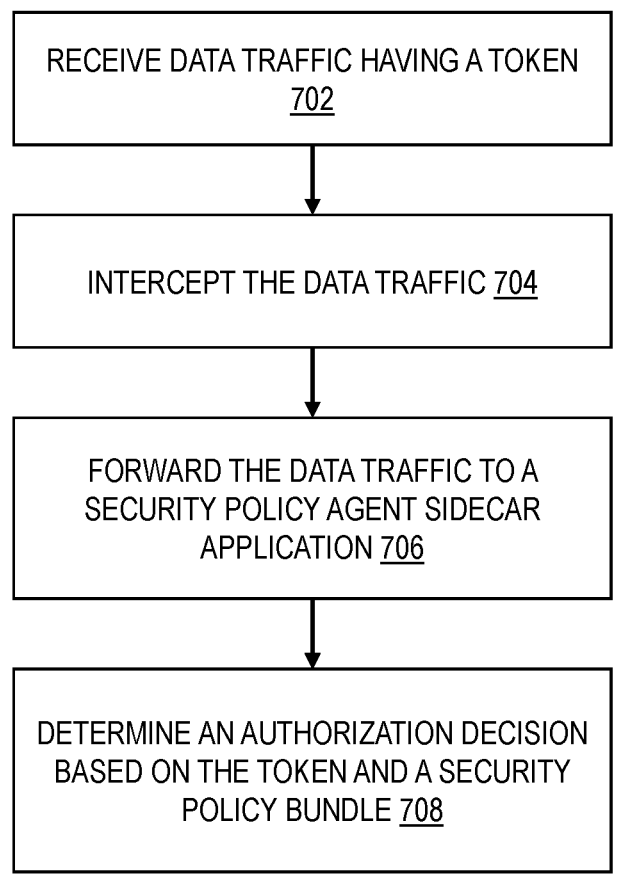
FIG. 7 is a flow diagram illustrating an exemplary computer-implemented method for authorizing access to one or more endpoints of an application, according to some aspects of the disclosed technology.

FIG. 7 is a flow diagram illustrating an exemplary computer-implemented method for authorizing access to one or more endpoints of an application, according to some aspects of the disclosed technology. Various components illustrated in FIGS. 3-4 may carry out the computer-implemented method. In 702, data traffic having a token attached to the data traffic may be received. The token may identify an authenticated user or service. In 704, a service mesh proxy sidecar application deployed on the application pod may intercept the data traffic to the application. In 706, the service mesh proxy sidecar application may forward the data traffic to a security policy agent sidecar application deployed on the application pod. In 708, the security policy agent sidecar application may determine an authorization decision based on the token and a security policy bundle loaded on the application pod. The security policy bundle may entitlements assigned to users and a security policy.

Exemplary Processor-Based System

Figure 8:
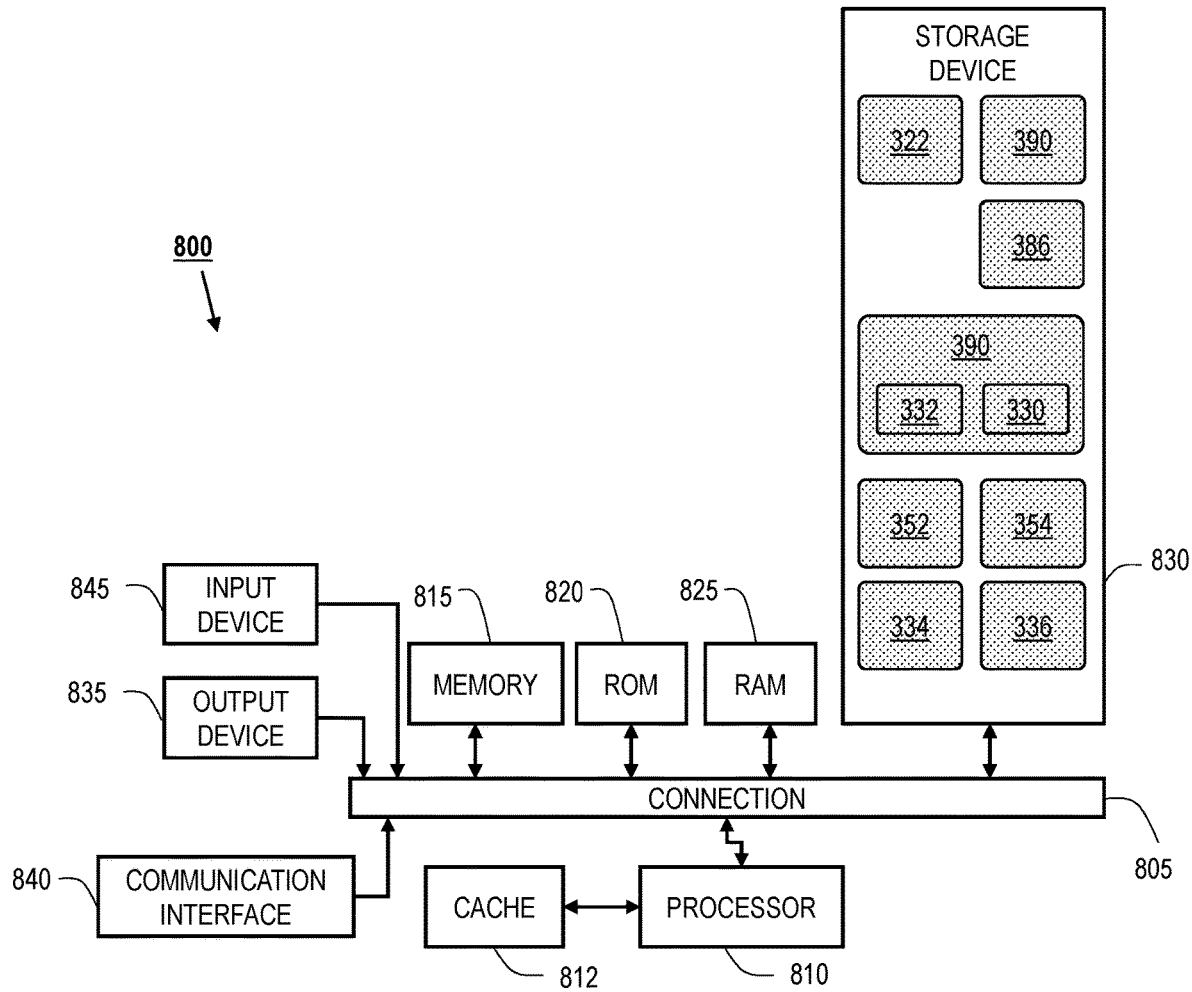
FIG. 8 illustrates an exemplary processor-based system with which some aspects of the subject technology may be implemented.

FIG. 8 illustrates an exemplary processor-based system with which some aspects of the subject technology may be implemented. For example, processor-based system 800 may be any computing device making up, or any component thereof in which the components of the system are in communication with each other using connection 805. Connection 805 may be a physical connection via a bus, or a direct connection into processor 810, such as in a chipset architecture. Connection 805 may also be a virtual connection, networked connection, or logical connection.

In some embodiments, computing system 800 represents the local computing device 110 of FIG. 1 and/or the parts of cluster infrastructure 176 in data center 150 of FIG. 1. In some embodiments, one or more of the described system components represents many such components each performing some or all of the function for which the component is described. In some embodiments, the components may be physical or virtual devices.

Exemplary system 800 includes at least one processor 810 (e.g., a CPU or another suitable processing unit) and connection 805 that couples various system components including system memory 815, such as Read-Only Memory (ROM) 820 and Random-Access Memory (RAM) 825 to processor 810. Computing system 800 may include a cache of high-speed memory 812 connected directly with, in close proximity to, or integrated as part of processor 810.

Processor 810 may include any general-purpose processor and a hardware service or software service, such as executable instructions that implement functionalities such as methods and processes described herein. The functionalities carried out by one or more of: components illustrated in FIGS. 3-4. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms known to those of skill in the art. In some instances, multimodal systems may enable a user to provide multiple types of input/output to communicate with computing system 800. Computing system 800 may include communications interface 840, which may generally govern and manage the user input and system output. The communication interface may perform or facilitate receipt and/or transmission of wired or wireless communications via wired and/or wireless transceivers.

Storage device 830 may be a non-volatile and/or non-transitory and/or computer-readable memory device and may be a hard disk or other types of computer-readable media which may store data that are accessible by a computer.

Storage device 830 may include software services, servers, services, etc. When the code that defines such software is executed by the processor 810, the software may cause the system 800 to perform a function. In some embodiments, a hardware service that performs a particular function may include the software component stored in a computer-readable medium in connection with the necessary hardware components, such as processor 810, connection 805, output device 835, etc., to carry out the function.

One or more components illustrated in FIGS. 3-4 may be encoded in instructions stored in storage device 830. The instructions may be executable by the at least one processor 810 to carry out the functionalities of the one or more components. Examples of the components include: service mesh proxy sidecar application 352, security policy agent sidecar application 354, service mesh proxy webhook 334, security policy agent webhook 336, route authentication manager 322, authorization manager 390, frontend 332, backend 330, and identity manager 386.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 is a computer-implemented system, comprising: cluster infrastructure; application orchestration system to receive a request to deploy an application on the cluster infrastructure to a pod, and to schedule the application to the pod, wherein the request includes first metadata indicating that a security policy agent is enabled; a controller in the application orchestration system to inject a security policy agent sidecar application to the pod and configuration for the security policy agent sidecar application corresponding to the application to the pod; and an authorization manager to receive the security policy for the application from a developer for the application, translate the security policy into a format compatible with the security policy agent sidecar application, and store the translated security policy in a security policy bundle storage; wherein the security policy agent sidecar application is to receive (or receives) the translated security policy from the security policy bundle storage, and the security policy agent sidecar application is to enforce (or enforces) the translated security policy.

In Example 2, the computer-implemented system of Example 1 can optionally include the request further including second metadata indicating that a service mesh proxy is enabled.

In Example 3, the computer-implemented system of Example 1 or 2 can optionally include: the controller being further to inject (or injecting) a service mesh proxy sidecar application to the pod.

In Example 4, the computer-implemented system of Example 3 can optionally include: the service mesh proxy sidecar application being to route (or routing) authorization requests to the security policy agent sidecar application.

In Example 5, the computer-implemented system of any one of Examples 1-4 can optionally include the security policy agent sidecar application being to make (or making) authorization decisions of the authorization requests based on the translated security policy.

Example 6 is a computer-implemented method for security policy management, comprising: deploying a security policy agent sidecar application alongside an application deployed on cluster infrastructure; receiving, from an application developer, a set of entitlements assigned to one or more of: users, groups, or services; receiving, from the application developer, a route-based authorization policy for the application comprising one or more routes and entitlements to access the one or more routes; generating a security policy bundle for the application by converting the set of entitlements and the route-based authorization policy into a format compatible with the security policy agent sidecar application; and writing the security policy bundle for the application onto security policy bundle storage.

In Example 7, the computer-implemented method of Example 6 can optionally include the set of entitlements and the route-based authorization policy being received through a user interface of a frontend application of an authorization manager.

In Example 8, the computer-implemented method of Example 6 or 7 can optionally include the route-based authorization policy is received as a JavaScript Object Notation (JSON) file.

In Example 9, the computer-implemented method of any one of Examples 6-8 can optionally include: transmitting a post request to send the route-based authorization policy to a backend application of a policy manager.

In Example 10, the computer-implemented method of any one of Examples 6-9 can optionally include: validating and parsing, by a backend application of a policy manager, the route-based authorization policy; and saving data parsed from the route-based authorization policy into a database.

In Example 11, the computer-implemented method of any one of Examples 6-10 can optionally include: regularly checking a database storing security policies for one or more of: a new security policy, and a change to an existing security policy.

In Example 12, the computer-implemented method of any one of Examples 6-11 can optionally include converting the set of entitlements and the route-based authorization policy comprising: augmenting and formatting the entitlements and the route-based authorization policy into a JavaScript Object Notation (JSON) file and a policy code file; and packaging the JSON file and the policy code file into an archive file, wherein the archive file is the security policy bundle for the application.

In Example 13, the computer-implemented method of Example 12 can optionally include the JSON file including the entitlements.

In Example 14, the computer-implemented method of Example 12 or 13 can optionally include the JSON file including entitlements directly assigned to users of a group.

Example 15 is a computer-implemented method for provisioning security enforcement, comprising: receiving a request to deploy an application, wherein: the request includes metadata and an image of the application; and the metadata includes an annotation indicating that a service mesh proxy sidecar application is enabled, and a label indicating that a security policy agent sidecar is enabled; deploying the application as an application pod on cluster infrastructure; embedding a service mesh proxy sidecar application into the application pod; and embedding a security policy agent sidecar application into the application pod.

In Example 16, the computer-implemented method of Example 15 can optionally include retrieving, by the security policy agent sidecar application, a security policy bundle for the application from a security policy bundle storage; and processing, by the security policy agent sidecar application, authorization requests for access to one or more endpoints of the application from the service mesh proxy sidecar application based on the security policy bundle for the application.

In Example 17, the computer-implemented method of Example 15 or 16 can optionally include injecting security policy agent configuration specific to the application for the security policy agent sidecar application.

In Example 18, the computer-implemented method of Example 17, wherein the security policy agent configuration comprises a path to retrieve a security policy bundle specific to the application from a security policy bundle storage.

In Example 19, the computer-implemented method of any one of Examples 15-18 can optionally include injecting a utility application to fetch an access token to access a security policy bundle for the application at a security policy bundle storage.

In Example 20, the computer-implemented method of any one of Examples 15-19, further comprising: injecting a utility application to direct data traffic to the application pod to the service mesh proxy sidecar application.

Example 21 is a computer-implemented method for authorizing access to one or more endpoints of an application deployed as an application pod on a cluster, the method comprising: receiving data traffic having a token attached to the data traffic, wherein the token identifies an authenticated user; intercepting, by a service mesh proxy sidecar application deployed on the application pod, the data traffic to the application; forwarding the data traffic to a security policy agent sidecar application deployed on the application pod; and determining an authorization decision, by the security policy agent sidecar application, based on the token and a security policy bundle loaded on the application pod, wherein the security policy bundle includes entitlements assigned to users and a security policy.

In Example 22, the computer-implemented method of Example 21 can optionally include: forwarding the data traffic to the application on the application pod in response to determining that the authorization decision is an allow decision.

In Example 23, the computer-implemented method of Example 21 or 22 can optionally include: returning an error message to the user in response to determining that the authorization decision is a deny decision.

In Example 24, the computer-implemented method of any one of Examples 21-23 can optionally include the token being attached to the data traffic by a route authentication manager deployed on the cluster.

In Example 25, the computer-implemented method of any one of Examples 21-23 can optionally include the token being attached to the data traffic by a client that is outside of the cluster.

Example A is a computing system, comprising: one or more processors; one or more storage devices to store instructions executable by the one or more processors; and one or more components (e.g., one or more of: service mesh proxy sidecar application 352, security policy agent sidecar application 354, service mesh proxy webhook 334, security policy agent webhook 336, route authentication manager 322, authorization manager 390, frontend 332, backend 330, and identity manager 386) encoded in the instructions to perform any one of the computer-implemented methods in Examples 6-25.

Example B has one or more non-transitory computer-readable medium having instructions stored thereon, that when executed by one or more processors, cause the one or more processors to perform any one of the computer-implemented methods in Examples 6-25.

Example C is an apparatus comprising means to carry out or perform any one of the computer-implemented methods in Examples 6-25.

What is claimed is:

1. A computer-implemented method for security policy management, comprising:
   deploying a security policy agent sidecar application alongside an application deployed on cluster infrastructure;
   receiving, from an application developer, a set of entitlements assigned to one or more of: users, groups, or services;
   receiving, from the application developer, a route-based authorization policy for the application comprising one or more routes and entitlements to access the one or more routes;
   generating a security policy bundle for the application by converting the set of entitlements and the route-based authorization policy into a format compatible with the security policy agent sidecar application; and
   writing the security policy bundle for the application onto security policy bundle storage.

2. The computer-implemented method of claim 1, wherein the set of entitlements and the route-based authorization policy are received through a user interface of a frontend application of an authorization manager.

3. The computer-implemented method of claim 1, wherein the route-based authorization policy is received as a JavaScript Object Notation (JSON) file.

4. The computer-implemented method of claim 1, further comprising:
   transmitting a post request to send the route-based authorization policy to a backend application of a policy manager.

5. The computer-implemented method of claim 1, further comprising:
   validating and parsing, by a backend application of a policy manager, the route-based authorization policy; and
   saving data parsed from the route-based authorization policy into a database.

6. The computer-implemented method of claim 1, further comprising:
   regularly checking a database storing security policies for one or more of: a new security policy, and a change to an existing security policy.

7. The computer-implemented method of claim 1, wherein converting the set of entitlements and the route-based authorization policy comprises:
   augmenting and formatting the entitlements and the route-based authorization policy into a JavaScript Object Notation (JSON) file and a policy code file; and
   packaging the JSON file and the policy code file into an archive file, wherein the archive file is the security policy bundle for the application.

8. The computer-implemented method of claim 7, wherein the JSON file includes the entitlements.

9. The computer-implemented method of claim 7, wherein the JSON file includes entitlements directly assigned to users of a group.

* * * * *